3,257,717
METHOD OF MAKING AN ELECTRODE FOR USE IN THE ELECTROLYTIC FORMATION OF A HOLE IN A METAL WORKPIECE

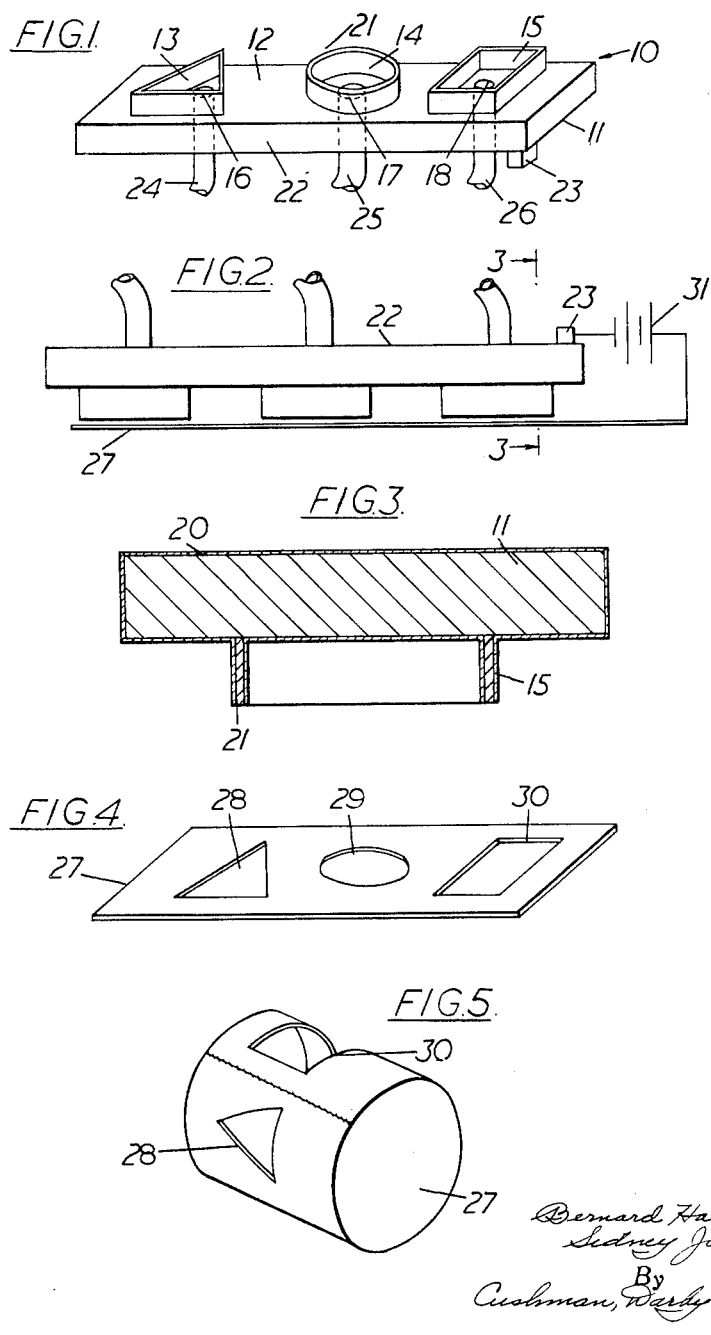

Bernard Hall Wilkinson, Glasgow, and Sidney Jacobs, Thornliebank, Scotland, assignors to Rolls-Royce Limited, Derby, England, a company of Great Britain
Filed July 5, 1962, Ser. No. 207,662
Claims priority, application Great Britain, July 7, 1961, 24,750/61
8 Claims. (Cl. 29—400)

This invention concerns a method of making an electrode (e.g. a simple "throw-away" electrode) for use in the electrolytic formation of an hole in a metal workpiece.

According to the present invention, there is provided a method of making an electrode for use in the electrolytic formation of an hole in a metal workpiece, said method comprising forming a strip of sheet metal into a desired shape, mounting one edge of the shaped strip an electrical contact with a surface of a metal base member and securing said edge to the said surface, providing at least the said surface of the base member and all exposed surfaces of the shaped strip, except the edge of the shaped strip remote from the base member, with an electrically insulating coating, and providing the base member, before or after the shaped strip is secured thereto, with an electrical terminal.

Preferably the strip is formed into a closed shape (i.e. with its ends abutting each other) round a former of the respective shape.

Preferably the base member is formed, either prior to or subsequently to the mounting thereon of the shaped strip, with an hole communicating with the area enclosed by the shaped strip.

Preferably all exposed surfaces of the base member and shaped strip are provided with the electrically insulating coating, and the coating is thereafter removed from the edge of the shaped strip remote from the base member.

If desired, a number of shaped strips may be mounted on and secured to the metal base member.

The invention also comprises an electrode made by the method set forth above.

Additionally the invention comprises a method of forming an hole in a metal workpiece comprising mounting the said electrode adjacent to but spaced from the workpiece, making the workpiece and the electrode an anode and a cathode respectively in a direct current circuit, and supplying electrolyte to the space between the workpiece and the electrode.

Preferably the voltage between the workpiece and the electrode is substantially within the range 6 to 12 volts.

The workpiece may be a sheet metal workpiece and where this is so it may be bent into a desired shape after it has been formed with one or more holes.

The invention is illustrated, merely by way of example, in the accompanying drawings, in which:

FIGURE 1 is a diagrammatic prespective view of an electrode made in accordance with the present invention, FIGURE 2 is a diagrammatic elevation showing the electrode of FIGURE 1 placed adjacent to a sheet metal workpiece, FIGURE 3 is a section taken on the line 3—3 of FIGURE 2, FIGURE 4 is a perspective view of the sheet metal workpiece showing the holes which have been formed therein by the electrode of FIGURE 1, and FIGURE 5 is a perspective view showing how the sheet metal workpiece of FIGURE 4 may be formed to a cylindrical shape and have its opposite ends welded to each other.

Referring to the drawings, an electrode 10 for use in the electrolytic formation of holes in a metal workpiece comprises a metal base plate 11.

The base plate 11 has a surface 12 on, and in electrical contact with which, are mounted sheet metal strips 13, 14, 15, each of which may, for example, be $\frac{1}{16}''$ thick and $\frac{1}{4}''$ wide.

Prior to being mounted on the base plate 11, the strips 13, 14, 15 are bent around a former to any desired closed shape, i.e. so that their ends abut each other, the strips 13, 14, 15 being shown in FIGURE 1, merely for the sake of example, as being formed into a triangular, a circular, and a rectangular shape respectively. After being so formed, the ends of each of the strips are soldered together and each strip is placed, edge on, on the base plate 11 and is soldered thereto.

The base plate 11 is then drilled with holes 16, 17, 18 which respectively communicate with the areas within the strips 13, 14, 15. Alternatively, the holes 16, 17, 18 could of course be formed in the baes plate 11 prior to the strips 13, 14, 15 being secured thereto.

The base plate 11, with the strips 13, 14, 15 secured thereto, is then dipped in a bath containing a paint, a molten synthetic resin, or any other electrically insulating coating material, whereby all the exposed surfaces of the base plate 11 and strips 13, 14, 15 are coated with a layer 20 (FIG. 3) of the insulating coating material.

The insulating coating material is then removed (e.g. by filing) from those edges 21 of the strips 13–15 which are remote from the surface 12 of the base plate 11. The insulating coating material is also removed from a small area of a surface 22 of the base plate 11, the surface 22 being disposed opposite the surface 12, and a terminal 23 is then soldered to the said area of the surface 22.

Alternatively, the insulating coating material could be prevented from ever being deposited on the edges 21 and on the said area of the surfaces 22 e.g. by maintaining these regions covered with a masking material during the dipping of the base plate 11 and strips 13–15 in bath of insulating coating material.

The ends of electrolyte supply pipes 24, 25, 26 are then secured in the holes 16, 17, 18 respectively.

In FIGURE 2 there is shown a sheet metal workpiece 27 which is to be formed with holes 28, 29, 30 (FIGURE 4) whose shapes correspond to those of the strips 13, 14, 15 respectively.

The electrode 10 is placed closely adjacent to the sheet metal workpiece 27 so that the edges 21 of the electrode 10 are spaced from the workpiece 27 by a distance of, say, 0.005 to 0.040 inch.

The electrode 10 and workpiece 27 are then connected in a direct current circuit so as respectively to constitute a cathode and an anode, the said circuit incorporating a battery 31.

The voltage between the workpiece 27 and the electrode 10 is preferably arranged to be within the range 6 to 12 volts while the current density therebetween is preferably arranged to be within the range 30 to 150 amps. per square inch.

Electrolyte (e.g. common salt solution) is supplied to the pies 24–26 so that the electrolyte is given a mass flow through the space between the edges 21 and the workpiece 27 such as to prevent the formation of local concentrations of the products of electrolysis at the face of the workpiece.

The workpiece 27 will thus be formed, as a result of this electrolysis, with the said holes 28–30.

After being formed with the holes 28–30, the workpiece 27 may be bent to a desired shape. Thus if the workpiece 27 is to be made cylindrical in shape, it may be bent, as shown in FIGURE 5, so that its opposite ends abut, and these ends may then be welded to each other.

We claim:
1. A method of making an electrode for use in the electrolytic formation of an hole in a metal workpiece, said method comprising forming a strip of sheet metal into a desired shape, mounting one edge of the shaped strip in electrical contact wth a surface of a metal base member and securing the said edge to the said surface, providing at least the said surface of the base member and all exposed surfaces of the shaped strip, except the edge of the shaped strip remote from the base member, with an electrically insulating coating, and providing the base member with an electrical terminal.

2. A method of making an electrode for use in the electrolytic formation of an hole in a metal workpiece, said method comprising forming a strip of sheet metal round a former and into a desired closed shape, mounting one edge of the shaped strip in electrical contact with a surface of a metal base member and securing the said edge to the said surface, providing at least the said surface of the base member and all exposed surfaces of the shaped strip, except the edge of the shaped strip remote from the base member, with an electrically insulating coating, and providing the base member with an electrical terminal on an uninsulated part thereof.

3. A method of making an electrode for use in the electrolytic formation of an hole in a metal workpiece, said method comprising forming a strip of sheet metal into a tubular closed shape, mounting one edge of the shaped strip in electrical contact with a surface of a metal base member and securing the said edge to the said surface, forming the base member with an hole passing through the base member and communicating with the area enclosed by the shaped strip, providing at least the said surface of the base member and all exposed surfaces of the shaped strip, except the edge of the shaped strip remote from the base member, with an electrically insulating coating, and providing the base member with an electrical terminal on an uninsulated part thereof.

4. A method as claimed in claim 3 in which a number of shaped strips are mounted on and secured to the metal base member.

5. A method of making an electrode for use in the electrolytic formation of an hole in a metal workpiece, said method comprising forming a strip of sheet metal into a tubular closed shape, mounting one edge of the shaped strip in electrical contact with a surface of a metal base member and securing the said edge to the said surface, forming the base member with an hole passing through the base member and communicating with the area enclosed by the shaped strip, providing all the exposed surfaces of the base member and of the shaped strip, with an electrically insulating coating, removing the coating from the edge of the shaped strip remote from the base member and from a portion of the base member itself, and providing the said portion with an electrical terminal.

6. A method of electrolytically forming an hole in a sheet metal workpiece comprising making an electrode by the method comprising: forming a strip of sheet metal into a tubular closed shape, mounting one edge of the shaped strip in electrical contact with a surface of a metal base member and securing the said edge to the said surface, forming the base member with an hole passing through the base member and communicating with the area enclosed by the shaped strip, providing at least the said surface of the base member and all exposed surfaces of the shaped strip, except the edge of the shaped strip remote from the base member, with an electrically insulating coating, and providing an uninsulated portion of the base member with an electrical terminal, mounting said electrode adjacent to but spaced from the sheet metal workpiece, making the sheet metal workpiece and the electrode an anode and a cathode respectively in a direct current circuit while supplying electrolyte to the space between the sheet metal workpiece and the electrode by way of the said hole, and after the sheet metal workpiece has been formed with at least one hole, bending it into a desired shape.

7. A method as in claim 6 in which the voltage between the workpiece and the electrode is substantially within the range 6 to 12 volts.

8. A method as in claim 6 in which, after the sheet metal workpiece has been formed with at least one hole, it is bent into a cylindrical shape so that its opposite ends abut, the said ends being then welded together.

References Cited by the Examiner
UNITED STATES PATENTS

| | | | |
|---|---|---|---|
| 1,912,968 | 6/1933 | Bull et al. | 29—155.5 |
| 2,950,574 | 8/1960 | Slater et al. | 29—155.5 |
| 3,019,178 | 1/1962 | Williams | 204—224 |

JOHN F. CAMPBELL, *Primary Examiner.*

C. I. SHERMAN, J. M. ROMANCHIK, Jr.,
*Assistant Examiners.*